(12) United States Patent
Ferry et al.

(10) Patent No.: US 8,998,138 B2
(45) Date of Patent: Apr. 7, 2015

(54) SEATING INSTALLATION FOR A PASSENGER VEHICLE

(75) Inventors: David Ferry, Hove (GB); Paul Lawrie Edwards, West Drayton (GB); Nikki Lusardi, Redhill (GB); Nathan David Sparshott, Nutley (GB); Gareth Godfrey Southall, Cheslyn Hay (GB); Edward Alexander Parkinson-Bates, London (GB); Simon Pengelly, London (GB)

(73) Assignee: Virgin Atlantic Airways Limited, West Sussex (GB)

( * ) Notice: Subject to any disclaimer, the term of this patent is extended or adjusted under 35 U.S.C. 154(b) by 477 days.

(21) Appl. No.: 13/203,932

(22) PCT Filed: Mar. 4, 2010

(86) PCT No.: PCT/GB2010/050381
§ 371 (c)(1),
(2), (4) Date: Jan. 13, 2012

(87) PCT Pub. No.: WO2010/100500
PCT Pub. Date: Sep. 10, 2010

(65) Prior Publication Data
US 2012/0146372 A1 Jun. 14, 2012

(30) Foreign Application Priority Data
Mar. 4, 2009 (GB) .................................. 0903744.1

(51) Int. Cl.
*B64D 13/00* (2006.01)
*B60N 2/34* (2006.01)
*B64D 11/06* (2006.01)

(52) U.S. Cl.
CPC ........ *B64D 11/06* (2013.01); *B64D 2011/0617* (2013.01); *B64D 2011/062* (2013.01)

(58) Field of Classification Search
CPC .......... B64D 11/06; B64D 2011/0617; B64D 2011/062
USPC .................... 297/243, 354.13, 232; 244/118.6
See application file for complete search history.

(56) References Cited

U.S. PATENT DOCUMENTS

| | | | | |
|---|---|---|---|---|
| 1,309,520 | A | * | 7/1919 | Harris .............................. 297/63 |
| 2004/0232283 | A1 | * | 11/2004 | Ferry et al. ................. 244/118.6 |
| 2006/0192050 | A1 | | 8/2006 | Cheung et al. |
| 2007/0246981 | A1 | | 10/2007 | Plant |
| 2010/0038485 | A1 | * | 2/2010 | Harcup ...................... 244/118.6 |
| 2010/0193634 | A1 | * | 8/2010 | Hankinson et al. ........ 244/118.6 |

FOREIGN PATENT DOCUMENTS

| | | |
|---|---|---|
| DE | 485 505 C | 11/1929 |
| DE | 10 2006 056898 | 2/2002 |
| DE | 102006056898 A1 | 6/2008 |
| EP | 2 154 067 A2 | 2/2010 |
| GB | 2362095 A | 11/2001 |
| JP | 2004-537459 A | 12/2004 |
| WO | WO-03/013903 | 2/2003 |
| WO | WO-2007135373 A2 | 11/2007 |
| WO | WO-2009073244 A1 | 6/2009 |
| WO | WO-2009/101294 | 8/2009 |

OTHER PUBLICATIONS

Copy of Examination Report of New Zealand Patent Application No. 595236 dated Aug. 31, 2012 (2 pgs.).
International Search Report for Application No. PCT/GB2010/080381, Mailed Oct. 26, 2010.
International Preliminary Report on Patentablility and Written Opinion of the International Seraching Authority for Application No. PCT/GB/2010/050381, Mailed Sep. 6, 2011.
Japanese Application No. 2011-552525 Office Action dated on Nov. 26, 2013.
UK Application No. GB0903744.1 Combined Search and Examination Report under Section 17 & 18(3) date of report Jun. 30, 2009.
English Abstract of DE-102006056898 A1.
English Abstract of JP-2004-537459A.

* cited by examiner

*Primary Examiner* — Milton Nelson, Jr.
(74) *Attorney, Agent, or Firm* — Mintz Levin Cohn Ferris Glovsky and Popeo, P.C.

(57) ABSTRACT

A seating installation for a passenger vehicle, especially an aeroplane, the installation comprising a plurality of seat units, each seat unit having a back, two opposite sides and comprising a seat, which seat has a back-rest and a seat-pan and defines a longitudinal seat axis. The plurality of seat units are arranged in two adjacent files, each file defining a file axis, and the seat units in each file being oriented such that the axis of each seat unit subtends an acute angle with the respective file axis and being offset from one another along their respective seat axes to form at least one bay in each file behind the back of at least one seat unit and to one side of an adjacent seat unit in the same respective file, the seat units in the two respective files being staggered with respect to one another and the two files being disposed relative to one another such that at least one seat unit in each one of the files nests partially within a corresponding bay of the other file such that the seat units in the two respective files are arranged generally back-to-back with one another; and wherein each file comprises a succession of shields that are spaced along the respective file axis, the space between each pair of adjacent shields accommodating a respective seat of the file, the shields forming side screens for the seats, and the shields being configured and arranged such that a portion of at least one shield in each one of the files extends between two adjacent shields in the other file to form a rear screen for a corresponding seat in said other file disposed between the two adjacent shields.

29 Claims, 11 Drawing Sheets

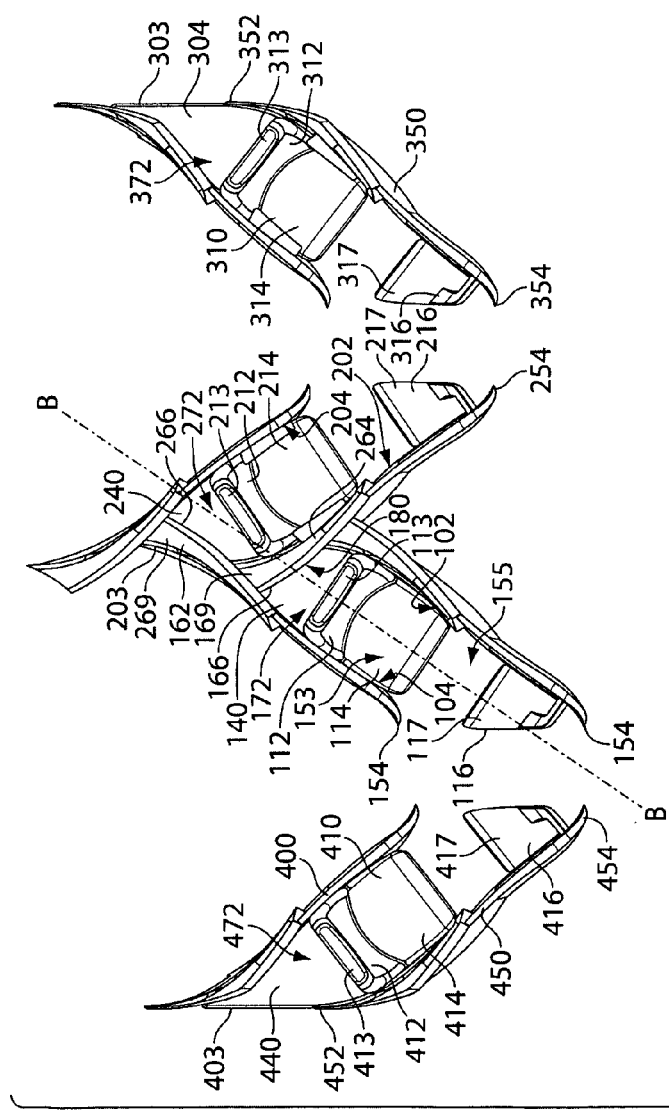
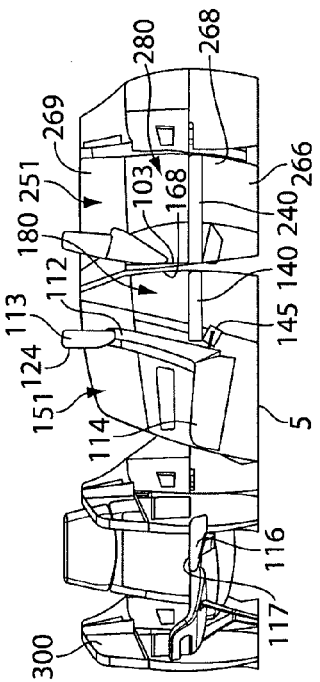
Fig. 8A
Fig. 8B

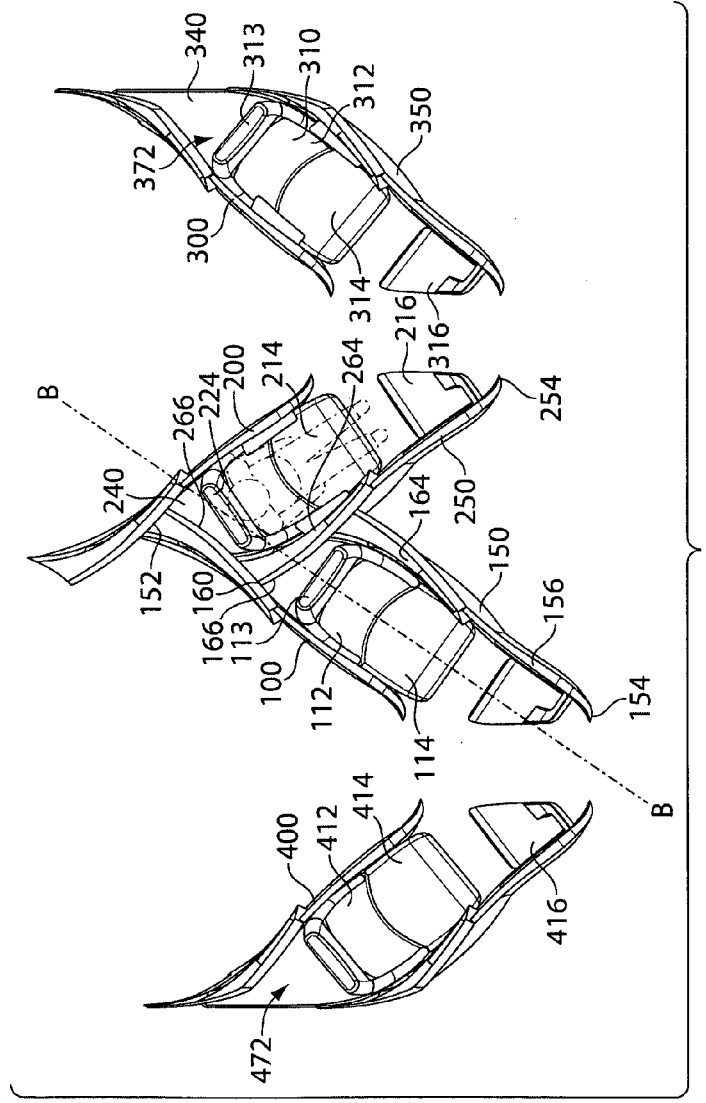
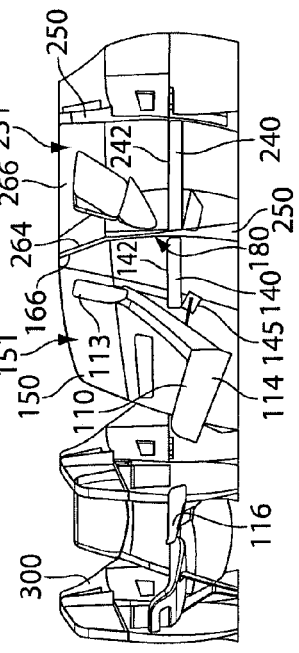
Fig. 9A
Fig. 9B

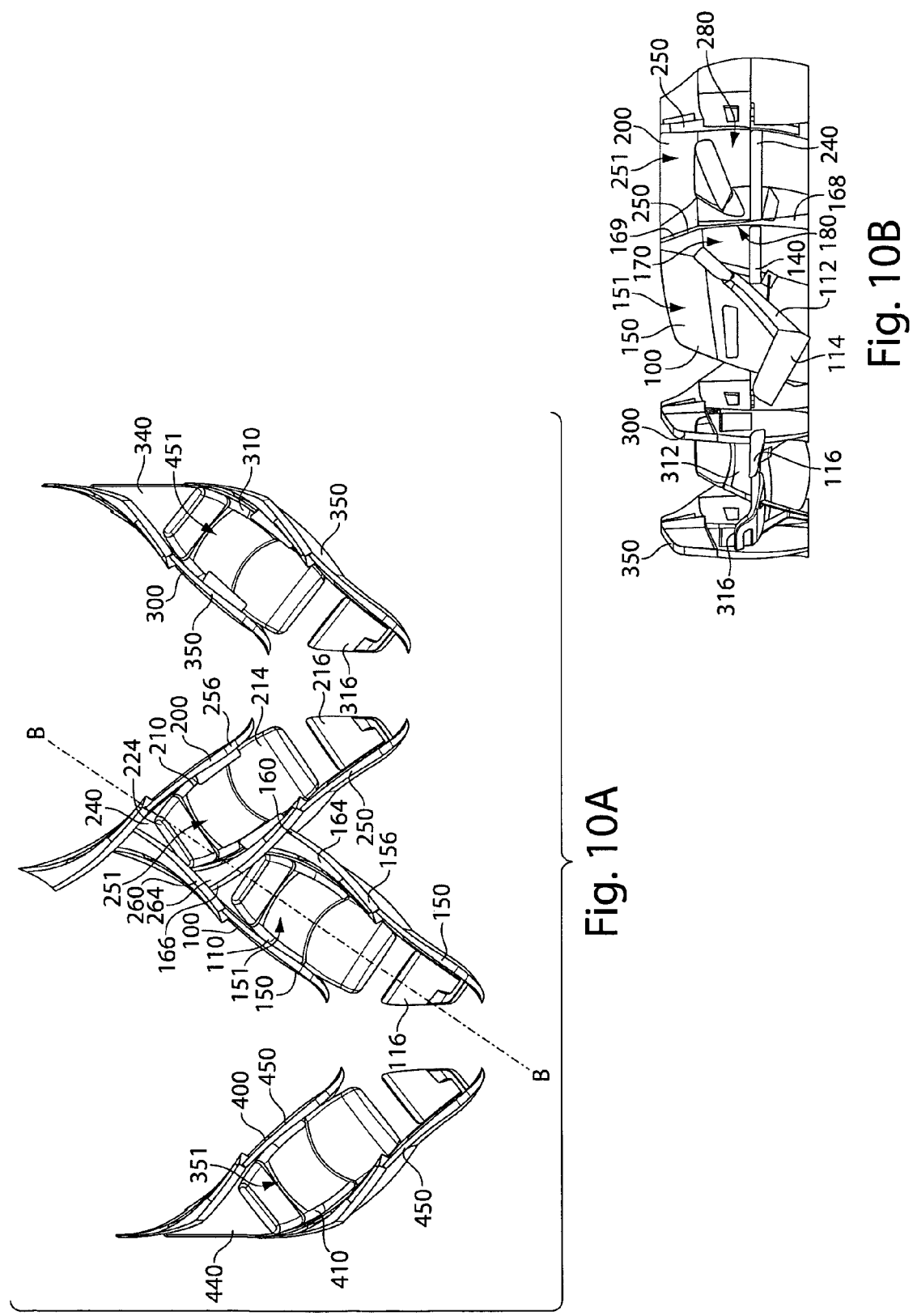

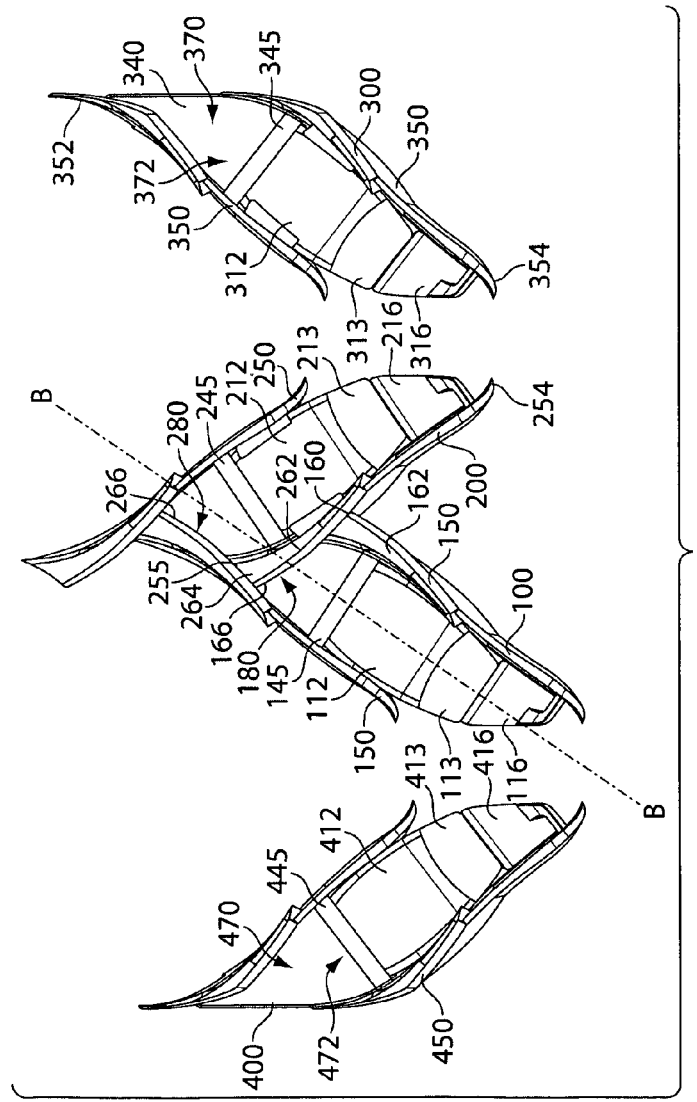
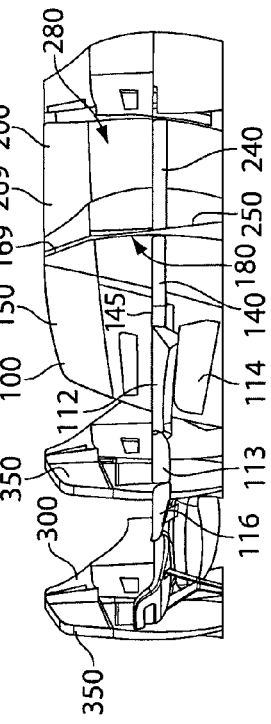
Fig. 11A
Fig. 11B

SEATING INSTALLATION FOR A PASSENGER VEHICLE

CROSS-REFERENCE TO RELATED APPLICATIONS

The present invention application is a 35 U.S.C. §371 national stage entry of PCT/GB2010/050381, which has an international filing date of Mar. 4, 2010 and claims priority to United Kingdom Serial No. 0903744.1, filed on Mar. 4, 2009, both disclosures of which are incorporated herein by reference in their entireties.

The present invention relates to a seating installation for a passenger vehicle, especially an aircraft, which seating installation comprises a plurality of seat units that are arranged to form two adjacent files of seat units in which the seat units are arranged generally back-to-side with one another.

The term "file" is used herein to mean a line of at least two seats or seat units that are arranged one generally behind another along the length of a vehicle, as opposed to a "row", which is commonly used to mean a line of seats that are arranged side-by-side transversely across a vehicle. The seat units are intended to be arranged on a single level within a deck of the vehicle, and do not form part of a multi-level seating arrangement on the same deck of the kind disclosed in, for example, US 2006/0192050 A1, which discloses a seating arrangement including seats at least having two levels adjacent to single-level seats, the multi-level seats including at least a bottom row of seats and a top row of seats.

The present invention also comprehends a seat pair for a passenger vehicle, said seat pair comprising first and second seat units that are arranged generally back-to-side to one another at an angle. In some embodiments, the seating installation of the present invention may comprise two adjacent files of seat units that are constituted by a plurality of seats pairs according to the invention, one pair disposed behind another.

WO-A-96/18537 of British Airways plc discloses a seating installation for a passenger aircraft, said installation comprising a plurality of seat units, each of which comprises a primary seat having a reclinable back-rest, a seat-pan and a leg-rest and a secondary seat that is positioned to face the primary seat. Said seating installation consists of two outboard files of such seat units, each outboard file being disposed adjacent a respective outer wall of an aircraft cabin and the seat units in each outboard file being angled obliquely towards or away from the respective outer wall to form an echelon, thereby to optimise the privacy between seat units and the use of available space within the cabin, and two inboard files of seat units that are positioned adjacent one another to each side of a longitudinal centreline of the cabin. The seat units of the inboard files are arranged in side-by-side pairs, one pair being disposed behind another.

According to WO-A-96/18537, the leg-rest of each primary seat is arranged to cooperate with the seat-pan to form a substantially flat surface when the back-rest is reclined in a substantially horizontal position. The secondary seat has a seating portion that is positioned to cooperate with the leg-rest of the primary seat to form a portion of the substantially flat surface when the back-rest of the primary seat is reclined in the substantially horizontal position.

WO-A-03/013903 of Virgin Atlantic Airways Ltd. discloses a different seating installation for a passenger vehicle comprising a plurality of seat units that are arranged to form two outboard and at least one inboard file of seat units in a cabin, the seat units in each file being positioned one generally behind another to define a respective file axis. Each seat unit defines a longitudinal seat axis and comprises means forming or being configurable for forming a seat comprising a back-rest and a seat-pan, the seat units in each file being arranged side-by-side in longitudinally offset relation to one another and oriented obliquely such that the axis of each seat unit subtends an acute angle with the corresponding file axis, thereby defining a space to the rear of each seat. Each seat unit further comprises means forming or being configurable for forming a substantially flat bed, a major proportion of which is disposed forwardly of the position of the seat, which bed extends rearwardly into said space to extend the flatbed. The seat units in each outboard file are angled obliquely away from the respective outer wall of the cabin, such that the space to the rear of each seat is formed adjacent to said outer wall, thereby to make efficient use of the available space in the cabin.

In some embodiments, the seat units of WO-A-03/013903 form two inboard files that are positioned adjacent to one another to each side of the longitudinal centreline of the cabin, with the seat units in each one of the inboard files being arranged generally back-to-back with the seat units in the other inboard file at an oblique angle to the centreline. As in WO-A-96/18537, the seat units of the two inboard files of WO-A-03/013903 are arranged to form a plurality of pairs, one pair being disposed behind another, and the seat units of each pair being generally aligned with one another along the centreline with reflectional symmetry.

The seating installation of WO-A-03/013903 represents an improvement over the installation of WO-A-96/18537 in that the arrangement of the seat units in the outboard files further optimises the use of available space in the cabin by utilising the space to the rear of each seat adjacent to the respective outer wall to extend the flatbed.

DE 10 2006 056 898 A1 discloses a passenger cabin with at least two seat rows, with seats aligned obliquely in relation to a central longitudinal axis of the cabin. DE 10 2006 056 898 A1 proposes that the seat rows should be offset relative to each other in the longitudinal direction of the central longitudinal axis, and the seat rows arranged intersectingly relative to a central axis of the seat rows. According to DE 10 2006 056 898 A1, the object achieved can be used with different passenger cabins with different seats, but particularly advantageously with passenger cabins, in which at least one seat of the intersectingly arranged seat rows may be converted into a lying position and/or, in addition to a main seat component, comprises an additional seat component forming a leg support surface.

GB 2362095 A discloses a passenger cabin comprising columns and rows of recliners in the form of compartments. Each recliner comprises a rotatable and releasably lockable chair with a detached ottoman/foot rest (which may also be used as a seat), towards which the chair faces after rotation from a first angular position (generally facing the front of the plane), through an angle of greater than 10°, to a second angular position (facing a second stowable table). Chair rotation to a third angular position (perpendicular to the first) allows the chair to face a first table, window or removable divider/partition.

The present invention does not involve the use of rotatable chairs or seats.

It is an object of the present invention further to optimise the use of available space in the cabin.

In accordance with one aspect of the present invention therefore there is provided a seating installation for a passenger vehicle, especially an aeroplane, said installation comprising a plurality of seat units, each seat unit having a back and two opposite sides and comprising a seat, which seat has a back-rest and a seat-pan and defines a longitudinal seat axis; wherein the plurality of seat units are arranged in two adjacent files, each file defining a file axis, and the seat units in each file being oriented such that the axis of each seat unit subtends an acute angle with the respective file axis and being offset from one another along their respective seat axes to form at least one bay in each file behind the back of at least one seat unit and to one side of an adjacent seat unit in the same respective file, the seat units in the two respective files being staggered with respect to one another and the two files being disposed relative to one another such that at least one seat unit in each one of the files nests partially within a corresponding bay of the other file such that the seat units in the two respective files are arranged generally back-to-side with one another;

and wherein each file comprises a succession of shields that are spaced along the respective file axis, the space between each pair of adjacent shields accommodating a respective seat of the file, the shields forming side screens for the seats, and the shields being configured and arranged such that a portion of at least one shield in each one of the files extends between two adjacent shields in the other file to form a rear screen for a corresponding seat in said other file disposed between said two adjacent shields.

The "seat axis" of each seat unit means the natural longitudinal axis of the seat that is implied by the backrest and seat-pan. When occupied by a person in the upright position, the seat axis extends substantially orthogonally to the person's spine in the front to back direction of the seat. Further, the axis of the person's spine, when seated upright, and the seat axis would define a plane that substantially bisects the seat vertically, such plane being oriented substantially orthogonally to the junction between the backrest and the seat pan.

By the "sides" of the seat units is meant the lateral portions of each seat unit that would be disposed naturally to each side of a person occupying the seat unit, such sides being disposed respectively one to each side of the seat axis and extending generally parallel therewith. The seat axis may be considered to divide each seat unit into two lateral halves, each half having a respective one of the sides of the seat unit.

The "back" of each seat unit means generally the portion of the seat unit that is juxtaposed or comprises the backrest and is disposed generally behind a person seated in the seat unit.

"Back-to-side" means that the seat units are arranged such that the seat units generally face away from one another with the back of at least one seat unit in each one of the files being juxtaposed the side of a corresponding seat unit in the other file and being side-on to the back of another seat unit in the other row that is adjacent to the corresponding seat unit. In the context of the seating installation of the present invention, persons using back-to-side seat units would face generally away from one another at an angle and, as described in more detail below, this angle may be, by way of illustration, in a range of about 60-90°, more typically about 65-75°.

In some embodiments, the seat units may be arranged such that the back-rest of the at least one seat unit in each one of the files extends into said bay of the other file.

As a result of the back-to-side configuration, the seat units may be arranged such that the back-rest and optionally at least a rear portion of the seat-pan of said at least one seat unit are disposed generally behind the back-rest of the one seat unit in the other file which, together with the adjacent seat unit in the same file, forms the bay, such that the upper body of a person using said at least one seat unit of the at least one file is disposed generally behind the one seat unit of the other file.

When the seats are reclinable or may be converted into a bed configuration as described below, this refers to the arrangement when the seats are upright.

The seat units may also be arranged such that the back-rest and optionally at least a rear portion of the seat-pan of said adjacent seat unit in the other file are disposed behind the at least one seat unit, such that the upper body of a person using said adjacent seat unit is disposed generally behind the at least one seat unit.

By arranging the seat units in accordance with the seating installation of the present invention, the use of available space in the vehicle is optimised by overlapping the footprint of the at least one seat unit in each one of the files with the other respective file, the footprint of said at least one seat unit extending into the bay defined by the two adjacent seat units of the other file. In this way, the area occupied by the seat units is minimised without significantly compromising the space available to a persons using an individual seat unit.

Typically, the two files define a centreline, and the two files intersect one another with the seat units in each one of the files extending over said centreline. The file axes may be parallel to one another. In some embodiments, the seat units in the two respective files may have translational as well as reflectional symmetry about said centreline.

Preferably the shields of each file are spaced regularly along the file axis, and suitably the spacing is substantially the same in both files.

Within each file, the shields interpose between adjacent seat units, defining a passenger accommodation area for each seat unit that accommodates the respective seat, affording privacy for a person using the seat. Owing to the offset between adjacent seat units in each of the files, each accommodation area may have an inner region that is bounded to each side by a respective shield and an outer region that is bounded by a shield on just one side. The outer region may facilitate entry into the accommodation area by a passenger, and typically said outer region may open onto an aisle between seat units.

The inner region may accommodate the back-rest and seat pan of the seat of the seat unit. Each seat has two opposite sides corresponding to the two sides of its seat unit. Preferably the shields in each file are disposed contiguously or closely adjacent to the sides of the seats to optimise the use of space and to avoid unnecessarily large gaps between the sides of the seats and the adjoining shields.

Each shield may have an inner portion and an outer portion. Essentially the inner and outer portions are co-linear, although the shield may have a curvilinear form as described below. The inner portion may be an extension of the outer portion. The shield may therefore be essentially linear, in the sense that, while its precise shape may deviate from a straight line when viewed in plan, it is associated exclusively with one side of the corresponding seat unit. The two shields to each side of a seat units are generally parallel to one another and do not meet one another.

The inner region of the accommodation area of each one of the seats in each one of the files may be bounded by the inner portion of one shield to one side and by the outer portion of another shield to the other side, the inner portion of said other shield extending rearwardly relative to the one seat and being positioned contiguously with the inner region of a neighbouring seat unit in the same file.

The inner portion of at least one shield in each one of the files may extend generally transversely between two adjacent shields in the other file to form a rear screen for the corresponding seat in the other file that is positioned between said adjacent shields. Each shield may have an inner end and an outer end. In some embodiments, the inner portion of the at least one shield may extend between the inner end of one of the adjacent shields of the other file and a point intermediate the inner and outer ends of the other one of the adjacent shields. Typically the intermediate point may be situated in the vicinity of the transition between the inner and outer portions of the other shield.

Thus, the accommodation area at the back of the at least one seat in each one of the files, between two adjacent shields in the file, may overlap with about 20-40%, typically about 30-35%, of the accommodation area at one side of the corresponding seat in the other file. The intermediate point may therefore be proximate a front of the seat-pan of the corresponding seat in the upright configuration.

The inner portion of the at least one shield may be disposed contiguously with each of the adjacent shields of the other file, so there are essentially no gaps between the inner region of the seat unit between said adjacent shields in the other file and the accommodation areas to each side of the shield of the one file.

Since the seat units of the two files are arranged generally back-to-side as defined above, each seat is oriented to face outwardly of its accommodation area, with the seat-pan being positioned closer to the outer region than the back-rest. The shields may thus form, for each seat, a rear screen behind its back-rest and side-screens to each side. The inner portion of the at least one shield may thus form part of the side-screen for a seat in one file and the rear screen for the corresponding seat unit in said other file.

The rear screen may be positioned at the back of its respective seat unit and spaced from the back-rest of the respective seat to afford additional space behind the back-rest. This additional space may be used for stowage, e.g., for bedding materials (pillows, blankets, etc.), when the seat is upright. In some embodiments, the rear screen of one seat unit and one side screen of an adjacent seat unit in the same file may define said bay behind the one seat unit.

Advantageously, the at least one shield may be curved to define an alcove behind the corresponding seat to afford extra space for the seat of the one file at a first level and extra space for the corresponding seat of the other file at a second level, the first level being above the second level. Thus the inner portion of each shield may be curved in the vertical plane to extend away from the seat of the one file in an upper region, and to extend away from the corresponding seat in the other file in a lower region. In this way, the space in the region where the seat units of the two files meet is shared in an efficient way by enlarging the accommodation area at the upper level at the side of the seat of the one file, where more space is desired for a passenger's upper body and arms, and enlarging the accommodation area at the lower level for the corresponding seat of the other file where more space may be required for a passenger to lie flat for sleeping as described in more detail below.

Each shield may therefore interpose between one side of the seat unit of the one the file and the back of the corresponding seat unit in the other file, thereby defining a space at the back of the seat unit in the other file between the back-rest of the seat and the shield. Each shield may curve partially around the rear of the seat of the seat unit in the one file to increase the size of said space behind the seat of the seat unit in the other file. This curve may have a tighter radius at said lower level than at said upper level. The inner portion of each shield may have a helical form, flaring progressively outwardly away from the side of the seat of the seat unit in the one file towards the upper level and curving inwardly towards the rear of the seat unit. In the region of the transition between the inner and outer portions of the shield, which may be disposed juxtaposed the front of the seat pan of the seat of the seat unit of the one file, the shield may be directed outwardly away from the side of the seat towards the rear of the seat, the angle of divergence between the side of the seat and the shield decreasing progressively towards the rear of the seat to provide the curve around the rear of the seat mentioned above.

Suitably, each file may comprise a plurality of seat units forming a succession of bays behind the back-rests of the seat units and to the respective one sides of the adjacent seat units in the same file, and a plurality of the seat units in each one of the files nests partially within a plurality of corresponding bays in the other file. The seat units in the two adjacent files are staggered with respect one another such that along the centreline defined by the two adjacent files, the seat units in each one of the files alternate with the seat units in the other file.

In another aspect of the present invention therefore there is provided a seating system for a passenger vehicle, especially an aircraft, said system comprising a pair of adjacent files of seat units having an abutting edge between the files, the units of each file being angled in relation to the file axis, the units of one file being offset relative to the units of the other file at the abutting edge, such that a first portion of each seat unit of each file is aligned with a second portion of each seat unit of the other file, and a dividing screen at the abutting edge, the screen being shaped to extend over a notional dividing line between the files so as to increase the size of each seat unit at the first portion thereof whilst correspondingly reducing the size of each seat unit at the aligned second portion thereof.

Preferably, the seats of the seat units may be reclinable, and the at least one seat unit of each one of the files may be positioned such that its back-rest reclines into said corresponding bay of the other file.

In yet another aspect of the present invention there is provided a seat-pair for a passenger vehicle, especially an aeroplane, said seat-pair comprising first and second seat units, each seat unit having two opposite sides and comprising a seat, which seat has a back-rest, a seat-pan and defines a respective seat axis, and a shield interposed between said seat units, the seat units being arranged such that their respective seat axes subtend an acute angle, the backrest of the first seat unit being positioned generally to the rear of the backrest of the second seat unit and the backrest of said second seat unit being disposed generally to one side of the first seat unit, said shield thus forming a side screen for the first seat unit and a rear screen for the second seat unit.

As described above, seat units may define a centreline therebetween, the seat units having reflectional and translational symmetry about the centreline, and the acute angle may generally be in the range of about 60-90°, typically about 65-75°.

Preferably, the seat units may be convertible into a bed configuration.

In some embodiments, the seat units may be configured to recline fully into a bed configuration in which the seat-pan and back-rest are substantially coplanar, forming a flat bed. In the bed configuration the back-rest may extend further into the space behind the seat intermediate the rear screen than in the upright position.

Generally, the seat-pan and back-rest may be movable into a bed configuration, and may optionally cooperate with other fixed or movable surfaces forming part of the seat unit.

In other embodiments, the back-rest may be arranged to fold forwardly and the rear surface of the back-rest maybe adapted to form part of a bed surface. Suitably, the back-rest may be arranged to fold forwardly over the seat-pan in a manner as disclosed in WO-A-03/013903. Suitably, the rear surface of the backrest may be substantially planar, forming a surface for sleeping.

An auxiliary surface may be provided within each seat unit behind the backrest of the seat, which auxiliary surface is arranged to cooperate with the rear surface of the backrest to form the bed surface. Said auxiliary surface may extend between the rear screen of the seat unit and the side screens that enclose and define the passenger accommodation area within the seat unit. Said auxiliary surface may be shaped and positioned such that it abuts contiguously the rear and side screens within the inner region of the accommodation area.

Suitably, in the bed configuration, said at least one seat in each file may extend into said corresponding bay defined by the other file. Optionally, or more additional auxiliary surfaces may be provided within each seat unit to extend the area of the bed surface. For instance, an additional auxiliary surface may be provided to one side of the backrest in the folded forward position to extend the bed surface laterally.

Generally, the present invention comprehends that a variety of different mechanisms maybe employed for reclining or reconfiguring each seat unit as a bed, and the invention is not limited to any particular reclining or other mechanism for achieving this.

Suitably, each seat may further comprises a leg-rest. In some embodiments, the leg-rest may be articulated to the seat-pan in a manner known to those skilled in the art. Alternatively, the leg-rest may be provided by a separate foot-stool, ottoman or pedestal that is positioned forwardly of the seat pan and backrest. Said leg-rest may be positioned in the outer region of the accommodation area. Said leg-rest may have an upper surface that is adapted to cooperate with the other elements of the seat to form the bed surface in the bed configuration. Thus, in some embodiments, the upper surface of the leg-rest may cooperate with the rear surface of the backrest and said auxiliary surface to extend the bed surface within the seat unit.

Conveniently, each seat unit may comprise a side-screen extending juxtaposed said leg-rest, which side screen is flared outwardly at floor level to afford extra foot-room or room for storing small items of hand luggage, such as a handbag or the like, for a person using the seat of the seat unit. Said side screen may suitably be provided by the outer portion of the adjacent shield, which may also have a helical configuration to provide such a flared shape.

According to yet another aspect of the present invention there is provided a seat unit for a passenger vehicle, especially an aircraft, which seat unit is configurable as a seat or as a bed, the seat unit being arranged to be placed side-by-side with a further seat unit such that the seat units form a file of seat units, with the longitudinal seat axes of the units arranged at an oblique angle to the file axis, and such that a first part of one seat unit is aligned with a second part of an adjacent seat unit in a direction across the width of the seat units, the seat unit including a dividing screen at one longitudinal side thereof for dividing the seat unit from an adjacent unit, the screen being shaped so as to extend inwardly of the seat unit at the first portion thereof to reduce the width, and to extend correspondingly outwardly of the adjacent seat unit at the second portion thereof to increase the width.

Following is a description by way of example only with reference to the accompanying drawings of embodiments of the present invention.

In the drawings:

FIG. 8A is a plan view of part of the seating installation of FIG. 1 showing a seat pair of the inboard files and one seat unit of each of the two outboard files, with all the seat units shown in the upright position;

FIG. 8B is a cross-sectional view on the line B-B of FIG. 8A;

FIG. 9A is a plan view of the same part of the seating installation of FIG. 1 as shown in FIG. 8A, but with all the seat units shown in a reclined position;

FIG. 9B is a cross-sectional view on the line B-B of FIG. 9A;

FIG. 10A is a plan view of the same part of the seating installation of FIG. 1 as shown in FIG. 8A, but with all the seat units shown the fully reclined position;

FIG. 10B is a cross-sectional view on the line B-B of FIG. 10A;

FIG. 11A is a plan view of the same part of the seating installation of FIG. 1 as shown in FIG. 8A, but with all the seat units shown in the bed configuration; and FIG. 11B is a cross-sectional view on the line B-B of FIG. 11A.

Figure 1:
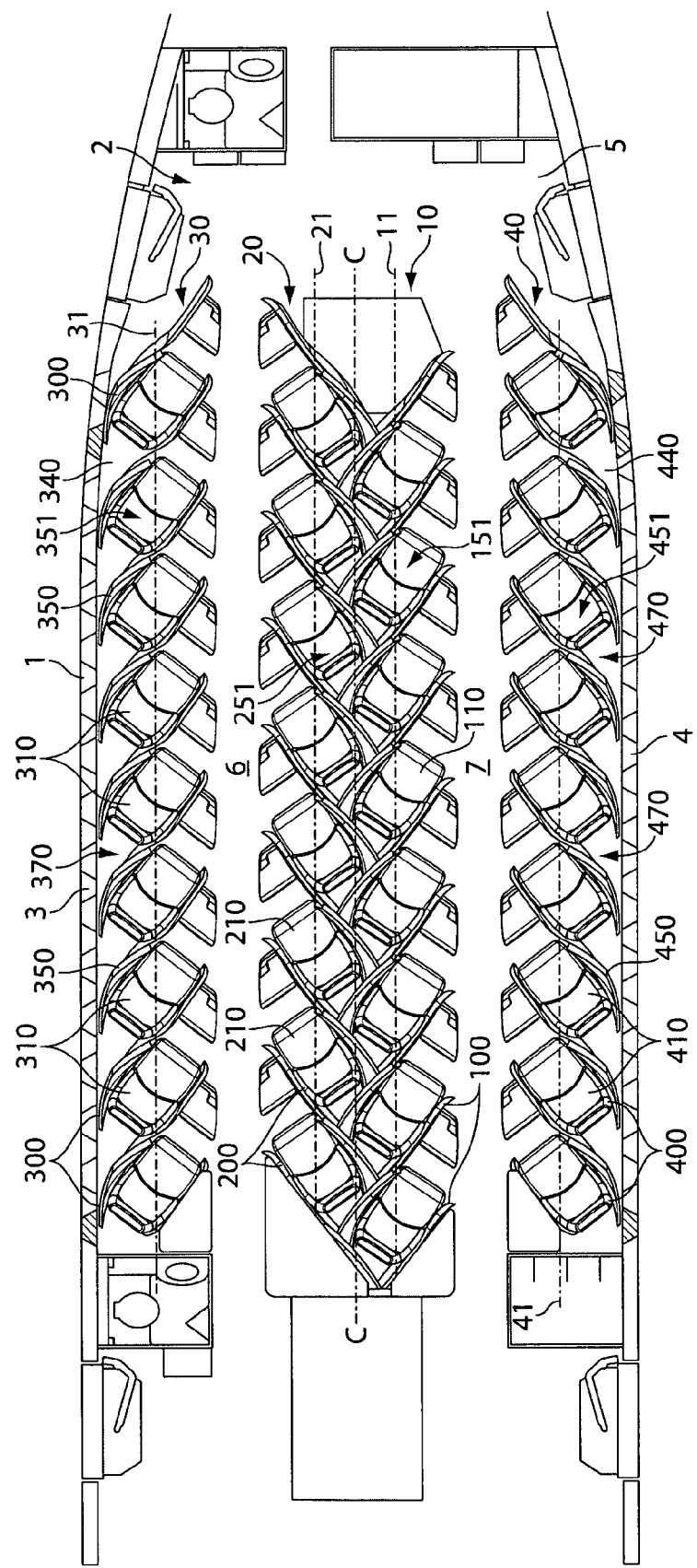
FIG. 1 is a plan view showing a seating installation in accordance with the present invention in a cabin of a passenger vehicle, particularly an aircraft, the seating installation having two inboard and two outboard files of seat units.

With reference to FIG. 1 of the drawings, a seating installation according to the present invention comprises a plurality of seat units (100, 200, 300, 400) arranged to form a plurality of files (10, 20, 30, 40) within a cabin (2) of a passenger vehicle (1). The seating installation of the invention as shown in FIG. 1 comprises two juxtaposed inboard files (10, 20) and two outboard files (30, 40), the two inboard files (10, 20) being disposed respectively to either side of a longitudinal centreline C-C that is defined by the two inboard files (10, 20), and each of the two outboard files (30, 40) being disposed adjacent a respective sidewall (3, 4) of the cabin. Two longitudinally extending passenger aisles (6, 7) are provided between each one of the outboard files (30, 40) and a respective nearest one of the inboard files (20, 10).

The cabin (2) of the passenger vehicle comprises a floor (5) and the seat units (100, 200, 300, 400) may be fixedly secured immovably to seat tracks (not shown) provided within the floor (5) in the conventional manner. Optionally, the seat units may be mounted on plinths (also not shown), with the plinths being fixedly secured to the seat tracks. Alternatively, the seat units may be attached directly to the seat tracks.

Suitably, the passenger vehicle may be an aircraft, and the side walls (3, 4) may be arcuate, curving inwardly and upwardly from the level of the floor (5) in the conventional manner (not shown).

Whilst the seating installation illustrated in the accompanying drawings comprises two inboard files (10, 20) and two outboard files (30, 40) as described above, in some embodiments, one or both of the outboard files (30, 40) may be omitted. Likewise, in some embodiments with wide vehicles, the seating installation may comprise two or more pairs of inboard files of seat units which would typically be arranged parallel to one another. In some embodiments, the cabin (2) may have a centreline, and where only two inboard files (10, 20) are provided, as shown in FIG. 1, the centreline C-C of the inboard files (10, 20) may be aligned with the cabin centreline. Where two or more pairs of inboard files are provided, then these may be distributed symmetrically about such a cabin centreline.

Similarly, whilst each inboard file (10, 20) of the seating installation illustrated in the drawings comprises eight successive seat units (100, 200) and each outboard file (30, 40) comprises nine successive seat units (300, 400) the actual number of seat units in each inboard or outboard file according to the invention generally may be varied, provided that at least one of the inboard files (10, 20) comprises at least two seat units (100, 200) as described in more detail below.

As will be observed in FIG. 1, the seat units (100, 200) of the two inboard files (10, 20) are arranged generally back-to-side, with the seat units (100, 200) being angled obliquely with respect to the centreline C-C, and the seat units (100, 200) in each one of the inboard files (10, 20) being staggered with respect to the seat units (200, 100) in the other inboard file (20, 10). Each seat unit (100, 200) in each one of the inboard files (10, 20) forms a seat pair with a corresponding adjacent seat unit (200, 100) in the other of the inboard file (20, 10). The seat units (100, 200) of the seat pair are arranged generally back-to-side with one another and generally have reflectional and translational symmetry with one another on the centreline C-C as described in more detail below. Whilst the seating installation as illustrated in FIG. 1 of the drawings comprises eight such seat pairs, a seat pair according to the invention comprises two seat units (100, 200) arranged back-to-side in the manner illustrated, and the inboard files (10, 20) may comprise a variable number of such seat pairs.

Figure 2:
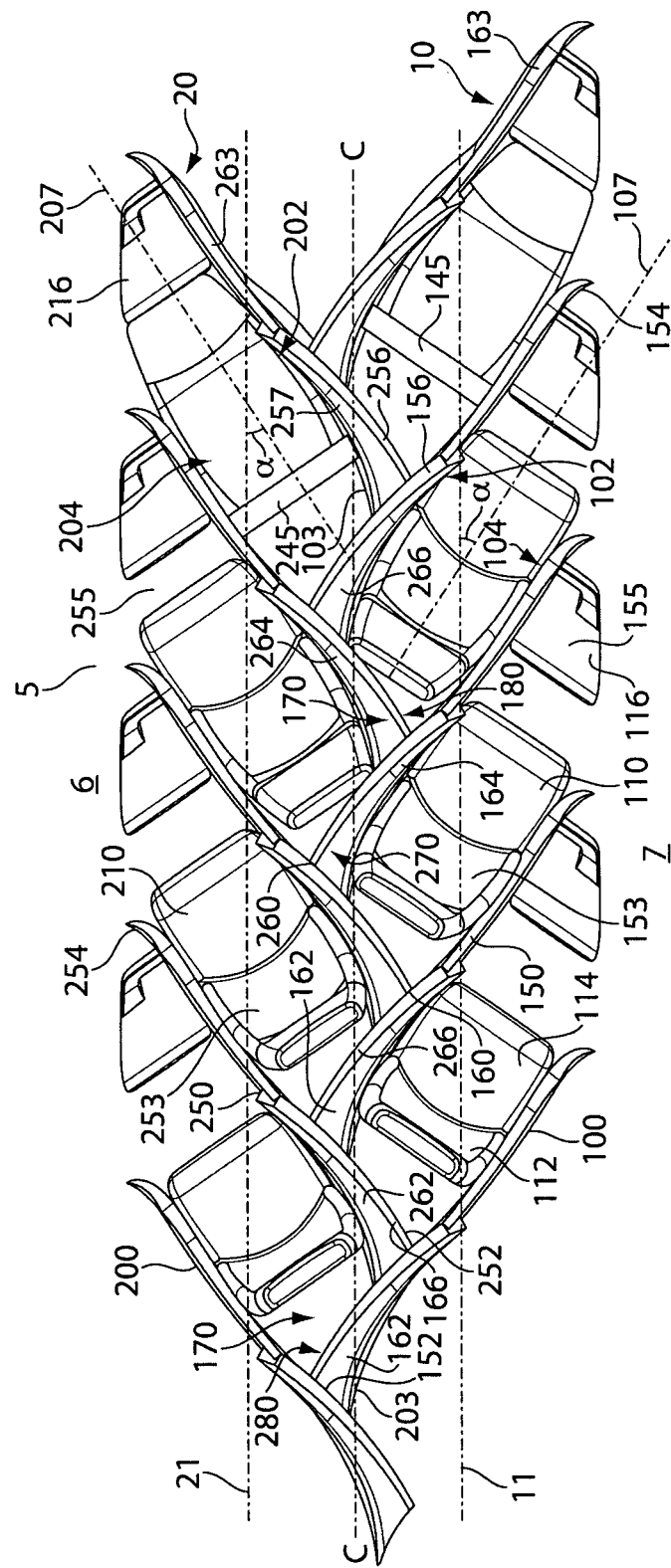
FIG. 2 is an enlarged view of part of the seating installation of FIG. 1, showing four seat pairs according to the invention, which are arranged to form part of the two inboard files of seat units.

FIG. 2 shows an enlarged view of four such seat pairs according to the invention which form part of the two inboard files (10, 20) of FIG. 1. The four seat pairs of FIG. 2 are shown in isometric view from above and to one side in FIG. 3.

Figure 4:
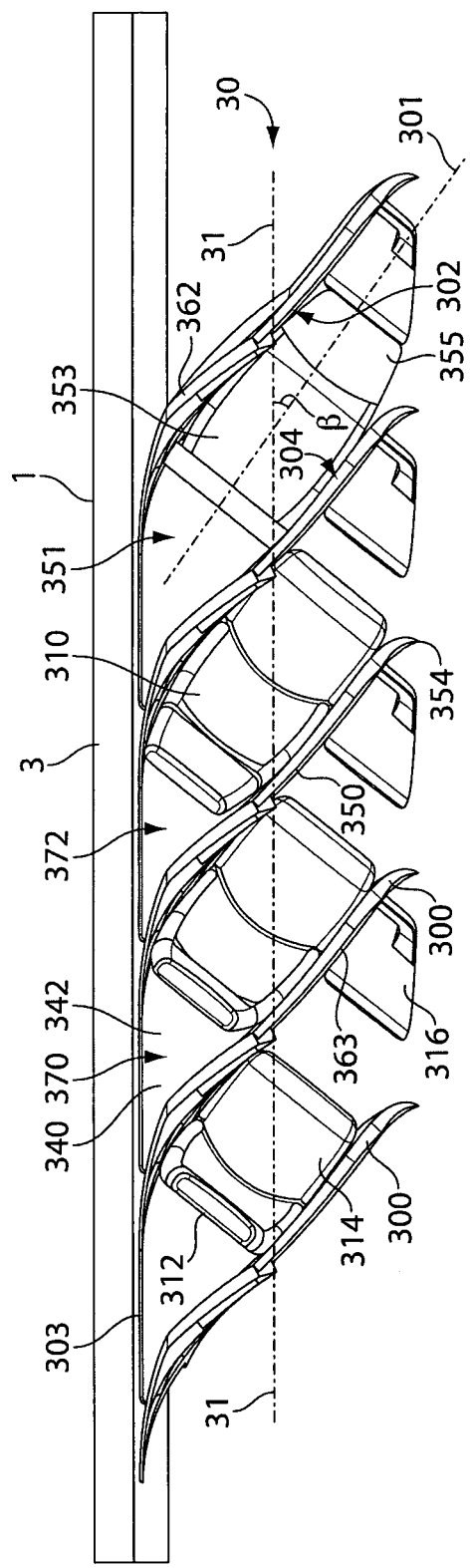
FIG. 4 is an enlarged view of another part of the seating installation of FIG. 1, showing part of one of the outboard files of seat units.

FIG. 4 similarly shows four contiguous seat units (300) of one of the outboard files (30) of FIG. 1.

Each of the inboard and outboard files (10, 20, 30, 40) defines a respective longitudinal file axis (11, 21, 31, 41). The longitudinal file axes (11, 21) of the inboard files (10, 20) are parallel to one another and, in the embodiment shown, parallel to the centreline C-C. However, it is not strictly necessary according to the invention for the file axes (11, 21) to be parallel to one another or to the centreline C-C. It will be appreciated from the following description that the two inboard files (10, 20) should be disposed closely adjacent to one another, and the file axes (11, 21) may subtend a small angle in some embodiments. In such case, the centreline C-C would bisect the angle subtended by the file axes (11, 21).

The file axes (11, 21, 31, 41) are also linear in the embodiment shown in FIG. 1, and whilst this is preferred, the file axes may in some embodiments be somewhat curvilinear, especially in the case of outboard files to accommodate the curvature of the cabin walls (3, 4) towards the front of an aircraft.

Figure 3:
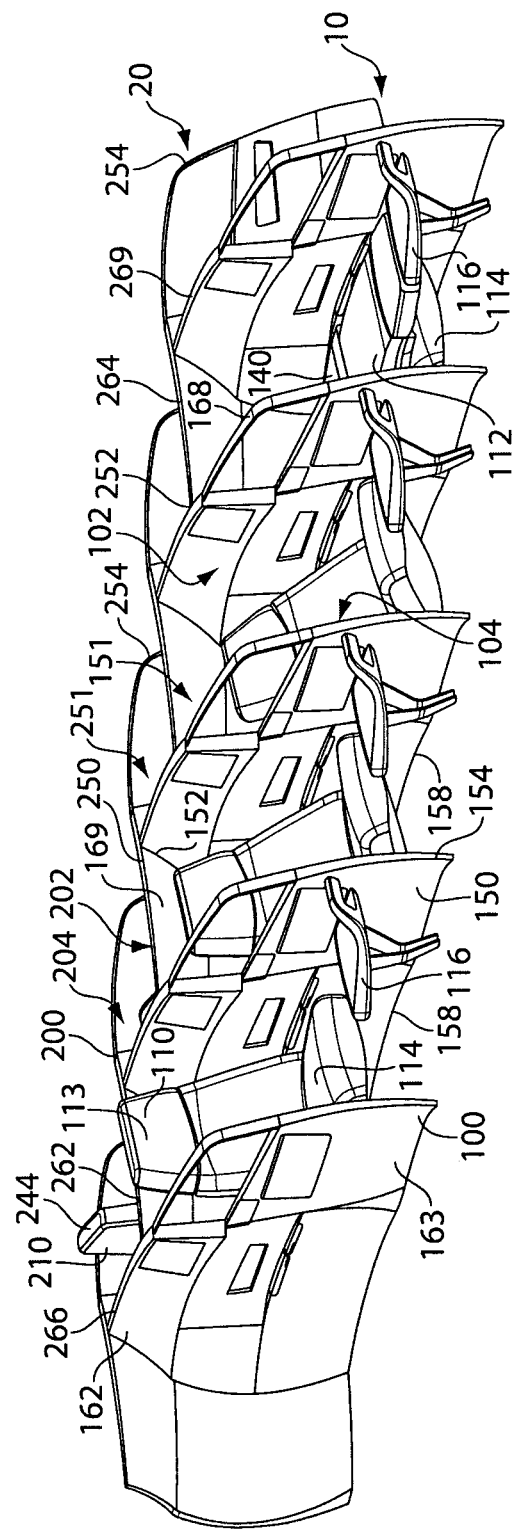
FIG. 3 is isometric view from above and to one side of the part of the seating installation of FIG. 2, with one seat unit shown in an upright position, another seat unit shown in a reclined position, yet another seat unit shown in a fully reclined position, and still another seat unit shown in a bed configuration.

As best illustrated in FIGS. 2 and 3, each seat unit (100, 200) of the inboard files (10, 20) comprises a seat (110, 210) and a lateral shield (150, 250) and has a back (103, 203) and two opposite sides (102, 104; 202, 204). The lateral shield (150, 250) extends along one side (102, 202) of its respective seat unit (100, 200) and the seat units (100, 200) are arranged in the files (10, 20) such that each file (10, 20) has a succession of shields (150, 250) spaced regularly along the respective file axis (11, 21). Each neighbouring pair of shields (150, 250) defines an individual passenger accommodation area (151, 251) therebetween, each accommodation area accommodating a respective seat (110, 210). Each accommodation area (151, 251) has an inner region (153, 253) and an outer region (155, 255). The inner region (153, 253) of each accommodation area is bounded on each side by a respective shield (150, 250), while the outer region (155, 255) is bounded by a shield on one side only, facilitating access to the accommodation area from the adjoining aisle (6, 7). Since the seat units (100, 200) in the two inboard files (10, 20) are staggered with respect to one another, the shields (150, 250) in said two inboard files are likewise staggered with respect to one another, such that along the centreline C-C the shields (150, 250) of the two inboard files (10, 20) alternate with one another.

Each seat (110, 210) comprises a back-rest (112, 212), a seat-pan (114, 214) and a leg-rest (116, 216), the leg-rest consisting of a foot-stool, and defines a longitudinal seat axis (107, 207). Within each accommodation area (151, 251), the backrest (112, 212) and seat-pan (114, 214) are generally accommodated within the inner region (153, 253). The leg-rest is generally situated within the outer region (155, 255). The lateral shield (150, 250) of each seat unit (100, 200) is disposed closely adjacent the one side of the seat (110, 210) of the seat unit to optimize the use of space within the cabin and to avoid unwanted gaps between the sides of the seats (110, 210) and the shields (150, 250). The lateral shield of a neighbouring seat in the same file is similarly disposed closely adjacent to the other side of the seat (110, 210).

In some embodiments, as described in more detail below, the seats (110, 210) are reclinable and/or may be formed into a bed configuration. Otherwise, the seats are immovable within the seat units (100, 200) and, in particular, are incapable of rotation of the like about any vertical axis; that is to say, the orientation of the seats is fixed.

As shown inter alia in FIG. 2, the seats (110, 210) in the two inboard files (10, 20) have reflectional symmetry about said centreline C-C. The seats (110, 210) are supported off the floor (5) (or plinth where provided) by suitable supporting structure of the kind known to those skilled in the art. In each file (10, 20) the seat units (100, 200) are positioned side-by-side, but are longitudinally offset from one another along their respective seat axes (101, 201) such that one part of each seat unit (100, 200) is aligned with different part(s) of its neighbouring seat unit(s).

The seat axis (107, 207) of each seat unit (100, 200) is angled obliquely at an acute angle α to the respective file axis (11, 21) as shown in FIG. 2. This angle α may vary from one installation to another, but is typically in the range 20-45°, preferably 30-40°, more preferably 34-36°. In one embodiment, the angle α may be 34.20°; in another embodiment, the angle α may be 35.50°.

The pitch between successive seat units (100, 200) in each inboard file may also vary from one installation to another, but is typically in the range 635-1270 mm (25-50 inches), preferably 1000-4200 mm (39.4-472 inches), more preferably 1050-1100 mm (41.3-43.3 inches). In one embodiment, the pitch may be 1080 mm (42.5 inches). In general, the pitch between adjacent seat units (100, 200) in the inboard files (10, 20) and the angle α subtended by the seat axes (107, 207) with the respective file axes (11, 21) may be adjusted in order to optimize the use of space in aircraft cabins of different dimensions.

As illustrated in FIGS. 1 and 4, the seat units (300, 400) of the outboard files (30, 40) also comprise a seat (310, 410), including a back-rest (312), a seat-pan (314) and a leg-rest (316), and a lateral shield (350). In FIG. 4 only seat units (300) in one of the outboard files (30) are shown, but the seat units (400) in the other outboard file (40) are similar. Each seat unit (300) of the one outboard file (30) defines a seat axis (301) which subtends an angle β with the corresponding file axis (31) as shown in FIG. 4.

The seat units (300, 400) of the outboard files (30, 40) are thus similar to the seat units (100, 200) of the inboard files (10, 20), except that the pitch between adjacent seat units (300, 400) and the angle β subtended by the seat units (300, 400) of the outboard files (30, 40) (where present) and the respective file axes (31, 41) may be the same or different from the pitch and angle α of the seat units (100, 200) of the inboard files (10, 20).

It is a particular aspect of the present invention that, in some embodiments, the seat units (300, 400) of the outboard files (30, 40) may be arranged at a different pitch and at a different angle β from the seat units (100, 200) of the inboard files (10, 20).

In particular, the pitch between successive outboard seat units (300, 400) may be less than the pitch between successive inboard seat units (100, 200) and the angle β may be greater than the angle α. Typically, the pitch between adjacent seat units (300, 400) in the outboard files (30, 40) may be in the range 635-1270 mm (25-50 inches), preferably 950-1000 mm (37.4-39.4 inches), more preferably 970-980 mm (38.2-38.6 inches). The angle β may be in the range 35-40°, suitably 38-39°. In some embodiments, the pitch between successive outboard seat units (300, 400) may be 976 mm, and the angle β may be 38.50°.

As shown in FIGS. 1 and 2, the lateral shields (150, 25) of the two inboard files (10, 20) are angled at a similar angle to the respective file axes (11, as the seat units (100, 200). Each shield (150, 250) consists of a generally linear, vertically and horizontally extending wall having an inner portion (162, 262), which terminates at an inner end (152, 252), an outer portion (163, 263) which terminates at an outer end (154, 254), a top edge (156, 256) and a bottom edge (158, 258), which bottom edge abuts contiguously the floor (5). (See also FIGS. 5 and 6). Suitably, each of the shields (150, 250) extends vertically to approximately the same height above the floor (5) as the seats (110, 210) in the upright position. Each shield (150, 250) may be manufactured from a lightweight composite material of a kind that is suitable for use in aerospace applications and is shaped in the manner described in more detail below. Generally, the inner region (153, 253) of each accommodation area (151, 251) is bounded to one side by the inner portion (162, 262) of one shield (150, 250) and to the other side by the outer portion (163, 263) of another adjacent shield (150, 250) and the outer region (155, 255) on each accommodation area is bounded to one side only by the outer portion (163, 263) of the one shield.

As best shown in FIG. 2, the seat units (100, 200) in the inboard files (10, 20) are staggered, angled and, within each inboard file (10, 20), longitudinally offset from one another on their respective axes (107, 207), such that the inner portion (162, 262) of each one of the shields (150, 25) in each one of the inboard files (10, 20) extends over said centreline C-C generally transversely between two corresponding adjacent shields (250, 150) in the other juxtaposed inboard file (20, 10), with the inner end (152, 252) of each one of said shields (150, 250) meeting one of said two corresponding adjacent shields (250, 150) on the other side of the centreline C-C at a point (260, 160) intermediate its inner and outer ends (252, 254; 152, 154), proximate the transition between the inner portion (262, 162) and outer portion (263, 163) of the shield (250, 150); each one of the shields (150, 250) in each one of the inboard files (10, 20) extending across the inner end (252, 152) of the other corresponding adjacent shield (250, 150), with the inner end (252, 152) of said other corresponding adjacent shield (250, 150) meeting the one shield (150, 250) at said point (160, 260) intermediate its inner and outer ends (152, 154; 252, 254). In this manner, each passenger accommodation area (151, 251) between neighboring pairs of shields (150, 250) in each one of the inboard files (10, 20) is closed at an inner end by the inner portion (262, 162) of a corresponding shield (250, 150) of the other inboard file (20, 10). As shown in FIG. 2, the inner portions (162, 262) of the lateral shields (150, 250) of the two juxtaposed inboard files (10, 20) are generally arcuate in plan view so as collectively to define an approximate "sawtooth" pattern. The shape of the lateral shields (150, 250) is described in more detail below.

As shown in FIG. 2, therefore, said intermediate point (160, 260) may be positioned approximately one third of the way along the shield (150, 250) between its inner and outer ends (152, 154; 252, 254), such that each passenger accommodation area (151, 251) between neighbouring pairs of shields (150, 250) in each one of the inboard files (10, 20) overlaps at its inner end at the back of the seat unit (100, 200) with approximately one third of one side of the corresponding seat unit (200, 100) in the other inboard file (20, 10). In other embodiments, the extent of this overlap may be in the range of about 20-40%, typically about 30-35%.

The seats (110, 210) of the seat units (100, 200) are oriented within the passenger accommodation areas (151, 251) between the lateral shields (150, 250) with their backrests (112, 212) disposed inwardly towards the inner ends of the accommodation areas, such that the seats (110, 210) face outwardly from the accommodation areas (151, 251) towards the respective passenger aisles (6, 7). In this way, each lateral shield (150, 250) of each one of the juxtaposed inboard files (10, 20) forms a side-screen (164, 264) for its respective seat unit (100, 200), and the inner portion (162, 262) of each shield (150, 250) also forms a rear screen (266, 166) for a corresponding one of the seat units (200, 100) in the other inboard file (20, 10). Said side-screen (164, 264) is disposed to one side of its respective seat unit (100, 200) and said rear-screen (266, 166) is disposed at the back (203, 103) of the corresponding seat unit (200, 100) behind the back-rest. As will be appreciated from the foregoing and the accompanying drawings, the inner portion (162, 262) of each lateral shield (150, 250) forms part of the side-screen for a seat unit (100, 200) in each one of the inboard files (10, 20) and forms the rear screen for another corresponding seat unit (200, 100) in the other inboard file (20, 10). In combination, adjacent lateral shields (150, 250) in each one of the inboard files (10, 20) and the inner portion (262, 162) of a lateral shield (250, 150) of a corresponding seat unit (200, 100) in the other inboard file (20, 10) screen each seat unit (10, 20) on both sides and at its back to afford privacy for a person using the seat unit (10, 20).

As best illustrated in FIG. 2, the seat units (100, 200) of the juxtaposed inboard files (10, 20) are thus arranged to form a succession of concave recesses or "bays" (170, 270) at the back of the seat units (100, 200) in each file (10, 20), each bay (170, 270) being formed by the rear screen (166, 266) of one seat unit (100, 200) and the side-screen (162, 262) of an adjacent seat unit (100, 200) in the same file (10, 20). Accordingly, each bay (170, 270) is formed between the back (103, 203) of one seat unit (100, 200) and one side (102, 202) of the adjacent seat unit. The bays (170, 270) in each file (10, 20) extend over the centreline C-C, such that the two inboard files (10, 20) overlap one another in the region of the centreline, with each seat unit (100, 200) in each one of the inboard files (10, 20) nesting partially within a respective bay (270, 170) formed between two adjacent seat units (200, 100) in the other inboard file (20, 10), such that the backrest (112, 212) of each one of the seats (110, 210) in each one of the inboard files (10, 20) is disposed generally behind the backrest (212, 112) of a corresponding seat (210, 110) in the other inboard file (20, 10) and extends into a respective one of said bays (270, 170) defined by said other inboard file (20, 10), such that the upper body of a passenger using the one seat (110, 210) is disposed generally behind the back (203, 103) of the corresponding seat, and the backrest (212, 112) of said corresponding seat in the other inboard file is disposed generally to the one side (102, 202) of the one seat of the one inboard file and extends into a respective one of the bays (170, 270) defined by the one inboard file (10, 20); the backrest (212, 112) of the corresponding seat in the other inboard file also being disposed generally behind the back (103, 203) of an adjacent seat (110, 210) in the one inboard file to the one side (102, 202) of the one seat, such that the upper body of a passenger using the corresponding seat in the other inboard file is disposed generally behind the backrest of the adjacent seat in the one inboard file. In this way, the seats (110, 210) of the inboard files (10, 20) are disposed "back-to-side" with one another.

Thus, the seat units (100, 200) of the two juxtaposed inboard files (10, 20) are angled, staggered and longitudinally offset from one another within each file in such a manner that the seat units (100, 200) in each of the inboard files (10, 20) extend partially over the centreline C-C, thereby to optimise the use of available space within the cabin (2).

The seating installation in accordance with the present invention may be installed in a wide variety of passenger vehicles, especially passenger aircraft. For instance, the seating installation of the invention may suitably be installed in Boeing 747, 777, 787 and 767 aircraft or in Airbus 340, 330, 350 or 380 aircraft, amongst others. It has been found that by utilising the seating installation of the present invention, the passenger cabins in certain aircraft, depending upon their respective dimensions, especially their width across the longitudinal axis of the cabin, permit an additional inboard file of seat units to be provided, thereby significantly increasing the total number of seat units in the cabin. For instance, by suitably adjusting the respective pitches and angles α, β of the inboard and outboard files as described above, two inboard files (10, 20) and two outboard files (30, 40) of seat units can be fitted in the passenger cabins of Airbus A340-600 and Boeing 787-900 aircraft with the seating installation of the present invention, whereas by contrast the seating arrangement of WO-A-03/013903 allows only one inboard file and two outboard files of seat units to be fitted in these cabins, leading to an increase of six additional seats in the case of the Airbus 340 aircraft and three additional seats in the case of the Boeing 787 aircraft when the seating installation of the present invention is used.

Figure 6:
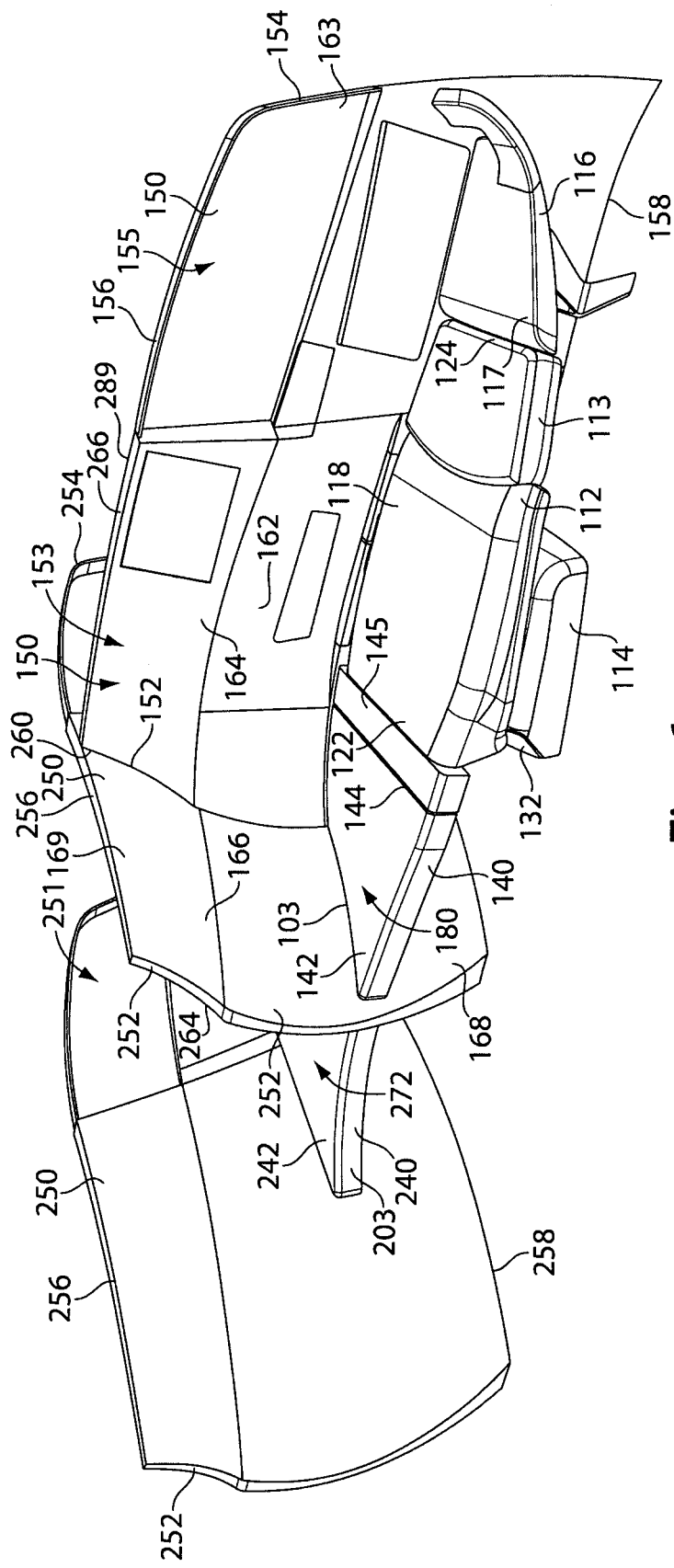
FIG. 6 is a partially cut-away isometric view from above and to one side of the seat pair of FIG. 5, with both seat units of the pair shown in the bed configuration.

In the embodiment illustrated in the accompanying drawings, each seat (110, 210, 310, 410) is reclinable between an upright position as shown in FIGS. 8A and 8B and a fully reclined position as shown in FIGS. 10A and 10B. As will be seen from the drawings, each seat (110, 210) when reclined extends further over the centreline C-C into the respective bay (270, 170). Each seat can also be configured to provide a flatbed as shown in FIGS. 6, 11A and 11B. However, it will be appreciated that the seating installation of the present invention may be used with non-reclinable seats or with seats that do not form flatbeds if desired.

Figure 5:
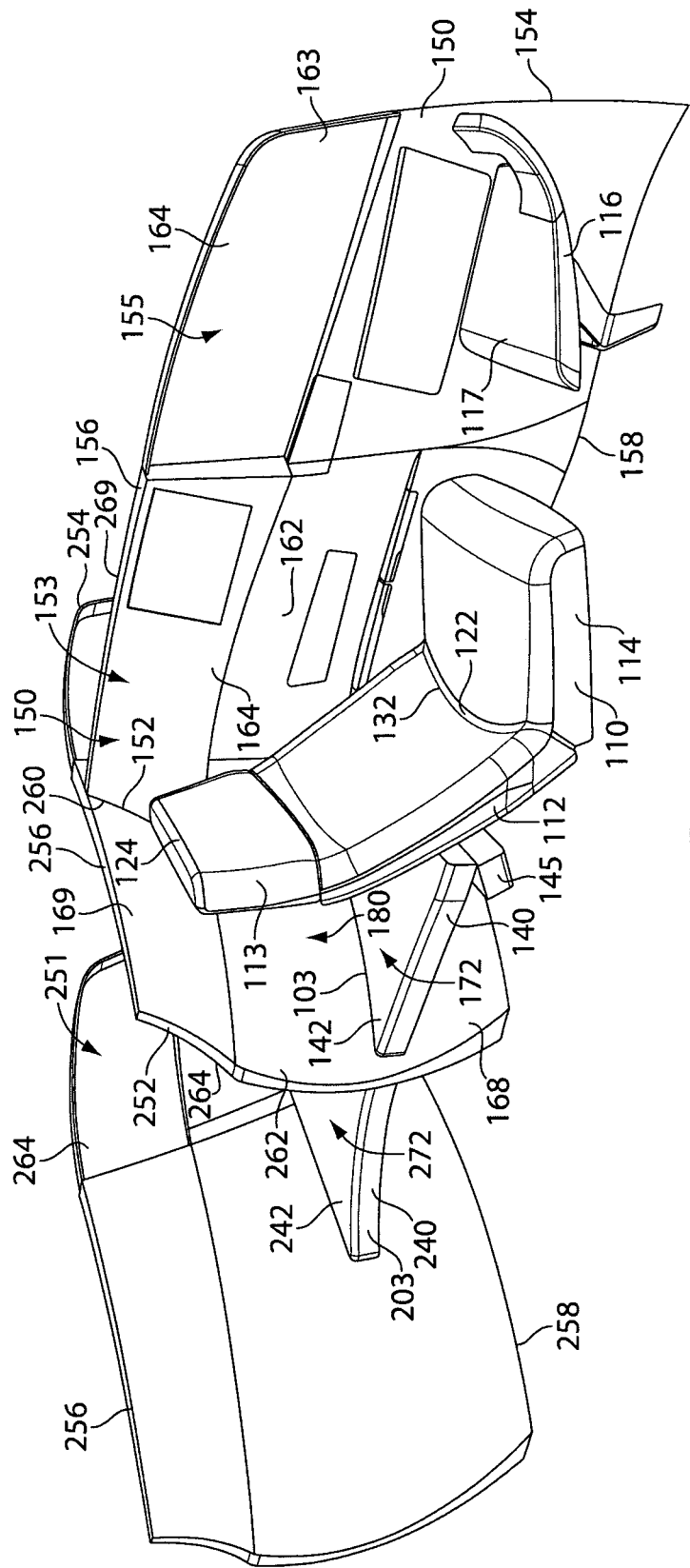
FIG. 5 is a partially cut-away isometric view from above and to one side of a seat pair in accordance with the invention, with one seat unit of the seat pair shown in a reclined position and the other seat unit of the pair in the bed configuration.

As best shown in FIG. 5, each seat (110, 210) of each one of the two inboard files (10, 20) is accommodated within its respective passenger accommodation area (151, 251) such that the backrest (112, 212) is spaced forwardly of its rear screen (166, 266), so as to provide a space (172, 272) between the backrest and the rear screen (166, 266) that is formed by the inner portion (262, 162) of a corresponding one of the laterals shields (250, 150) of the other inboard file (20, 10), as mentioned above. The backrest (112, 212) is articulated at a lower end (122) thereof to a rear end (132) of the seat pan (114) to afford the requisite reclining action between the upright position and the fully reclined position; in FIG. 5 and FIGS. 9A and 9B the seat units (100, 200) are shown in an intermediate reclined position between the upright and fully reclined positions. The back-rest (112, 212) comprises a head-rest portion (113, 213) at an upper end (124, 224) thereof. The foot-stool (116, 216), which serves to provide a leg-rest for a passenger using the seat, has an upper surface (117, 217) and is spaced forwardly of the back-rest (112, 212) and seat-pan (114, 214) within the outer region (155, 255) of the passenger accommodation area (151, 251) in the vicinity of the outer end (154, 254) of the lateral shield (150, 250). Suitable seat mechanisms for achieving the reclining action of the seats (110, 210) are known to those skilled in the art, for example from WO-A-03/013903, the contents of which are incorporated herein by reference, and are not described in more detail herein.

Intermediate the backrest (112, 212) and the rear screen (166, 266), the seat unit (100, 200) comprises a fixed shelf (140, 240) that is fixedly secured in the inner region (153, 253) of the passenger accommodation area (151, 251) to the inner portion (262, 162) of the one corresponding lateral shield (250, 150) of the other inboard file (20, 10) that forms the rear screen (166) and to each of the adjacent lateral shields (150, 250) of the one inboard file (10, 20) that form the passenger accommodation area with said inner portion. The fixed shelf (140, 240) has a substantially flat upper surface (142, 242) at substantially the same height above the floor (5) of the cabin (2) as the upper surface (117, 217) of the foot-stool (116, 216). In alternative embodiments, the upper surface (142, 242) may be supported directly off the floor (5). As can also be seen, the edges of the fixed shelf (140, 240) correspond to the shape of the lateral shields (150, 250) forming the rear-screen (166, 266) and side-screens (164, 264) such that the shelf abuts continuously on the shields substantially without any gaps therebetween.

As best shown in FIGS. 5, 6, 8B, 9B, 10B and 11B, the rear-screen (166, 266) comprises a generally vertically extending first lower portion (168, 268) which extends upwardly from the floor (5) to a point above the shelf (140, 240) approximately level with the junction between the backrest (112, 212) (when upright) and the headrest (113, 213) and an inclined second upper portion (169, 269) which is angled towards the backrest (112, 212) inwardly into the passenger accommodation area (151, 251) of the respective seat unit (100, 200). The first lower and second upper portions (168, 169; 268, 269) thus form a concave inner surface to the passenger accommodation area (151, 251) on the rear screen thereof (166, 266) which defines an alcove (180, 280) behind the backrest (112, 212). (See FIGS. 5 and 6). The first lower and upper second portions (168, 169; 268, 269) of the rear screen (166, 266) which interposes between the back of one seat unit (100, 200) in one of the inboard files (10, 20) and the one side (202, 102) of another corresponding seat unit (200, 100) in the other inboard file (20, 10) are thus shaped to provide extra space for the one seat unit (100, 200) at the level of the fixed shelf (140, 240) and extra space for the other corresponding seat unit (200, 100) above the level of the junction between the first and second portions (168, 169; 268, 269).

As best illustrated in FIGS. 9B and 10B, the rear-screen (166, 266) is also configured to allow the backrest (112, 212) to recline rearwardly to the fully reclined position as shown in FIG. 10B without the upper end (124, 224) or any other part thereof impinging on the rear-screen (166, 266). In the fully reclined position, the backrest (112, 212) extends further into the bay (270, 170) formed between two adjacent seat units (200, 100) in the other inboard file (20, 10) and extends into the alcove (180, 280) defined by the rear-screen (166, 266).

In plan view, as mentioned above and best seen in FIG. 2, the inner portion (162, 262) of each lateral side shield (150, 250) of each one of the seat units (100, 200) in each one of the inboard files (10, 20) is arcuate, curving inwardly partially around the backrest (112, 212) of the respective seat (110, 210) of the one seat unit (100, 200) to reduce the volume occupied by the space (172, 272) behind and to one side (102, 202) of the seat (110, 210) and increase the space (272, 172) behind and to the other side (204, 104) of a corresponding seat (210, 110) in the other inboard file (20, 10), said inner portion (162, 262) interposing between said one and corresponding seats (110, 210).

Each lateral shield (150, 250) has a generally helical shape defined by its curvature in the horizontal and vertical planes. The inner portion (162, 262) flares outwardly away from the side of the adjacent seat (110, 210) towards its upper edge (156, 256). The inner portion (162, 262) is also angled outwardly from the side of the adjacent seat towards its inner edge (152, 252), but is curved inwardly towards said inner edge (152, 252) around the rear of the backrest (112, 212) with the radius of curvature being tighter at the level of the shelf (140, 240) than juxtaposed the upper edge (152, 252) of the shield.

As illustrated in FIGS. 6, 7, 11A and 11B, the seat (110, 210) within each individual passenger accommodation area (151, 251) can be selectively reconfigured to form a flat bed.

In some embodiments, the seats may be adapted to recline fully to a position in which the back-rest is substantially coplanar with the seat-pan to provide a flat bed for a passenger. By "flat bed" herein is generally meant that the back-rest and other component(s) forming the bed, e.g., in some embodiments the seat-pan, are moved to a position in which they are substantially coplanar, i.e., subtend an angle of 180° or substantially 180°. In its widest sense, "flat bed" does not necessarily imply that the bed surface itself has to be substantially planar, although advantageously that is the case in the embodiment illustrated in the accompanying drawings, most clearly shown in FIG. 6, in which, as an alternative to the arrangement found in other embodiments where the backrest is simply arranged to recline until it is substantially coplanar with the seat-pan, the backrest (112, 212) folds forwardly over the seat-pan (114, 240) to form a flat bed with the foot-stool (116, 216) and one or more other optional auxiliary surfaces within the seat unit (100, 200).

A suitable mechanism for converting the seats (110, 210) into a flat bed in the this manner is disclosed in WO-A-03/013903, the contents of which are incorporated herein by reference. It is unnecessary to describe that mechanism herein, but as illustrated in FIG. 6 especially, the backrest (112, 212) of each seat (110, 210) can be selectively folded forwardly over the top of the seat pan (114, 214), so that a rear surface (118, 218) of the backrest (112, 212) faces upwardly and is disposed at the same level as the upper surface (142, 242) of the fixed shelf (140, 240) and the upper surface (117, 217) of the foot-stool (116, 216). In the bed configuration, as shown in FIG. 6, the upper end (124, 224) of the headrest portion (113, 213) abuts contiguously the foot-stool (116, 216). In some embodiments, the lower end (122, 222) of the backrest (112, 212) may likewise abut contiguously on a forward edge (144, 244) of the fixed shelf (140, 240), but in the embodiment shown in the drawings, an oscillating infill piece (145, 245) is provided and the mechanism for the seat (110, 210) is such that as the back-rest (112, 212) moves forwardly into the bed configuration, the infill piece (145, 245) is caused or allowed to move from a stowed position as shown in FIG. 5 to a deployed position as shown in FIG. 6 in which the infill piece fills in a gap between the front edge (144, 244) of the fixed shelf (140, 240) and the lower edge (122, 222) of the backrest (112, 212). Thus, in the bed configuration, a flat bed surface is provided by the upper surface (142, 242) of the fixed shelf (140, 240), the infill piece (145, 245), the rear surface (118, 218) of the backrest (112, 212) and the upper surface (117, 217) of the foot-stool (116, 216). Advantageously, in the bed configuration, not only is a "flat bed" provided, but the bed surface itself is substantially planar, providing a more suitable surface for sleeping.

Figure 7:
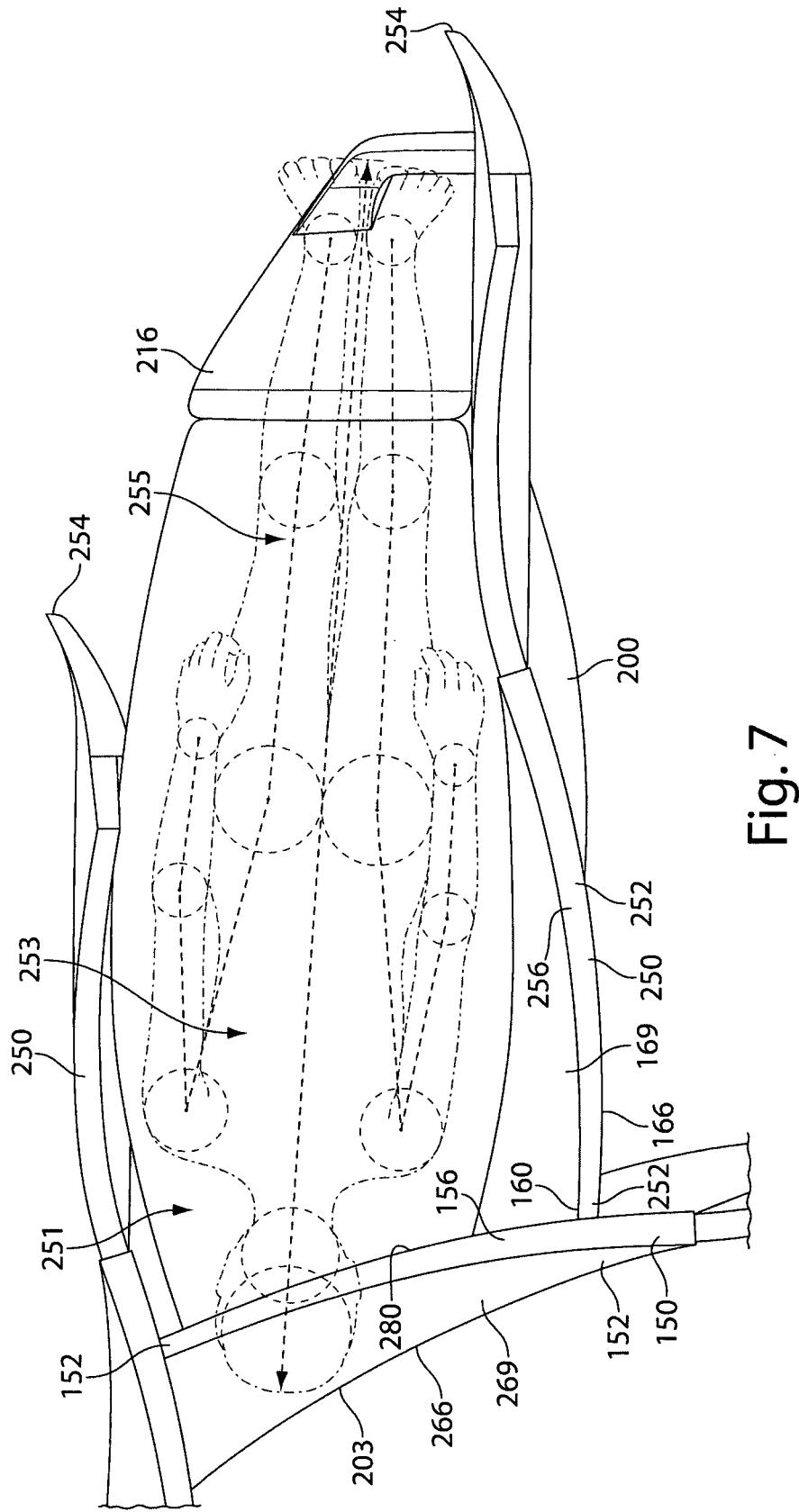
FIG. 7 is a plan view of a seat unit of a seating installation or seat pair according to the invention in the bed configuration, with the dimensions of an average male superimposed thereon.

The flatbed provided by the seat units (100, 200) described herein can be configured to provide a sleeping surface having a usable length of up to about 1890 mm (74.5 inches) between the rear screen (166, 266) and the end of the foot-stool (116, 216) and a maximum length of about 2030 mm (about 80 inches) as shown in FIG. 7, and in the bed configuration each one of the seats (110, 210) in each one of the inboard files (10, 20) extends further into a respective one of the bays (270, 170) between successive seats in the other inboard file (20, 10).

As described above, the inner portion (162, 262) of each lateral shield (150, 250) forms the rear screen (166, 266) between one respective seat unit (100, 200) in each one of the inboard files (10, 20) and another corresponding seat unit (200, 100) in the other inboard file (20, 10) and at least part of the side screen (264, 164) for the other corresponding seat unit (200, 100). In use, therefore, the above-described shape of the lateral shields (150, 250) affords additional space for a passenger using the one seat unit (100, 200) in the bed configuration as shown in FIG. 6 at the level of and just above the bed surface (117, 118, 142, 145; 217, 218, 242, 245), extending the bed surface into the alcove (180, 280) defined by the rear-screen (166, 266). At the same time, the shape of the lateral shields (150, 250) affords additional space for a passenger using the other corresponding seat unit (200, 100) in the upright or reclined positions, where the inclination of the second upper portion (169, 269) of the rear-screen (166, 266) into the inner region (153, 253) of the passenger accommodation area (151, 251) of the one seat unit (100, 200) provides additional room at the level of said upper portion (169, 269) in the passenger accommodation area (251, 151) of the corresponding other seat unit (200, 100), such additional room being provided to the side of the backrest (212, 112) of the seat of the other corresponding seat unit (200, 100) for the passenger's shoulders and upper body generally.

Further, as best seen in FIG. 3 and FIG. 5, the outer portion (163, 263) of each lateral shield (150, 250) of each one of the seat units (100, 200) in each of the inboard files (10, 20) is flared outwardly between the floor (5) and the upper surface (117, 217) of the foot-stool (116, 216) in the outer region (155, 255) of the accommodation area (151, 251) in the vicinity of the outer end (154, 254) to provide additional room for a passenger's feet or small items of hand luggage, such as handbags and the like, below the foot-stool (116, 216), this region of the lateral side shield (150) being aligned, as shown in FIG. 2, with the seat pan (114, 214) in the inner region (153, 253) of the accommodation area of an adjacent seat unit (100, 200) to the one side (102, 202) in the same inboard file (10, 20).

As mentioned above, the seat units (300, 400) of the outboard files (30, 40) of the seating installation of the embodiment illustrated in the accompanying drawings are similar to the seat units (100, 200) of the inboard files (10, 20), but as the seat units (300, 400) of the outboard files (30, 40) are not arranged back-to-side with other seat units, but instead abut on a respective outer wall (3, 4) of the cabin (2), the seat units (300, 400) of the outboard files (30, 40) do not have rear screens extending generally transversely at their backs behind their backrests (312, 412), but instead the fixed shelf (340, 440) at the back (303, 403) of each seat (310, 410) extends up to and butts onto said outer wall (3, 4) as best shown in FIG. 4.

The lateral shield (350, 450) of each outboard seat unit (300, 400) is shaped in a similar manner to the lateral shields (150, 250) of the inboard seat units (100, 200) to give additional shoulder room for a passenger occupying each seat unit (300, 400), an inner portion (362, 462) of the lateral shield (350, 450) of each one of the seat units (300, 400) interposing between and to one side (302, 402) the backrest (312, 412) and seat-pan (314, 414) of the one seat unit (300, 400) and the space (372, 472) at the back (303, 403) to the rear of the backrest (312, 412) of an adjacent seat unit (300, 400), the pitch between adjacent seat units (300, 400) in the outboard files (30, 40) as described above being less than the pitch between adjacent seat units (100, 200) in the inboard files (10, 20), and the seat units (300, 400) in the outboard files (30, 40) being angled with respect to the file axis (31, 41) and longitudinally offset with respect to one another on their respective seat axes (301, 401) to define a generally triangular space (372, 472) to the rear of each seat (300, 400) in a manner similar to that described in WO-A-03/13903.

The seating installation as hereinbefore described thus provides a space-efficient manner for arranging seat units (100, 200, 300, 400) in the cabin (2) of a passenger vehicle (1), such as an aircraft. In particular, by providing a pair of seat units (100, 200) arranged obliquely back-to-side, or two juxtaposed files (10, 20) of seat units, with the seat units of the two files arranged back-to-side, with the back-to-side seat units angled obliquely to face away from one another and staggered with respect to one another along a centreline C-C between the back-to-side seat units, the use of available space in the cabin is optimised. By adjusting the angle of each seat unit (100, 200, 300, 400) with respect to its corresponding file axis (11, 21, 31, 41), the pitch of the seat units in the respective files (10, 20, 30, 40) and by staggering the seats of the two inboard files (10, 20) as described above, an installation in accordance with the invention comprising two juxtaposed inboard files (10, 20) of seat units (100, 200) and two outboard files (30, 40) of seat units (300, 400) can enable extra seats to be installed in certain cabin spaces, whilst retaining sufficiently wide passenger aisles (6, 7) between adjacent inboard and outboard files (10, 30; 20, 40).

By interleaving the inner portions (162, 262) of the lateral shields (150, 250) of the two inboard files (10, 20) of seat units (100, 200), such that each inner portion (162, 262) serves as at least part of a side-screen for an adjacent seat in one of the inboard files (10, 20) and as a rear-screen for a corresponding seat in the other inboard file (20, 10), the use of space in the cabin is further optimised. The lateral shields (150, 250), especially the inner portions (162, 262) of the same, may be shaped, for example helically, to provide additional space at an upper level for the seat in the one inboard file (10, 20) to give a passenger more room for his/her upper body and arms/shoulders, and to afford additional space at a lower level for the corresponding seat in the other file (20, 10) to allow the provision of an extended bed surface at that lower level. In this way, the space between the two inboard files of seats (20, 10) is shared in an efficient manner.

The invention claimed is:

1. A seating installation for a passenger vehicle, especially an aeroplane, said installation comprising
a plurality of seat units, each seat unit having a back, two opposite sides and a seat defining a seat axis of the seat unit, the seat having a back-rest and a seat-pan;
wherein the plurality of seat units are arranged in two adjacent files, each file defining a file axis, and the seat units in each file being oriented such that the seat axis of each seat unit subtends an acute angle with the respective file axis and being offset from one another along their respective seat axis to form at least one bay in each file behind the back of at least one seat unit and to one side of an adjacent seat unit in the same respective file, the seat units in the two respective files being staggered with respect to one another and the two files being disposed relative to one another such that at least one seat unit in each one of the files nests partially within a corresponding bay of the other file such that the seat units in the two respective files are arranged generally back-to-side with one another; and
wherein each file comprises a succession of shields that are spaced along the respective file axis, the space between adjacent shields accommodating a respective seat of the file, the shields forming side screens for the seats, and the shields being configured and arranged such that a portion of at least one shield in each file extends between two adjacent shields in the other file and traverses the seat axis of a corresponding seat in the other file disposed between the two adjacent shields to form a rear screen for the corresponding seat.

2. A seating installation as claimed in claim 1, wherein each file comprises a plurality of seat units forming a succession of bays behind the backs of the seat units and to the respective one sides of the adjacent seat units in the same file, and a plurality of the seat units in each one of the files nests partially within a plurality of corresponding bays in the other file.

3. A seating installation as claimed in claim 1, wherein the file axes are parallel to one another.

4. A seat installation as claimed in claim 1, wherein the seat units are arranged such that in an upright position the back-rest of the at least one seat unit in each one of the files extends into the corresponding bay of the other file.

5. A seating installation as claimed in claim 1, wherein the seat units are arranged such that in an upright position the back-rest of the at least one seat unit in each one of the files is disposed generally behind the at least one seat unit in the other file, such that the upper body of a person when using the at least one seat unit in the one file is disposed generally behind the at least one seat unit of the other file.

6. A seating installation as claimed in claim 1, wherein the seat units are arranged such that in an upright position the back-rest of said adjacent seat unit in said other file is disposed behind the at least one seat unit in the one file, such that the upper body of a person when using said adjacent seat unit is disposed generally behind the at least one seat unit of the one file.

7. A seating installation as claimed in claim 1, wherein the seats are reclinable, and said at least one seat unit in each one of the files is positioned such that its back-rest reclines into the corresponding bay of the other file.

8. A seating installation as claimed in claim 1, wherein the two files define a centreline, and the seat units in each one of the files extend over said centreline.

9. A seating installation as claimed in claim 8, wherein the seat units in the two files have reflectional and translational symmetry about the centreline.

10. A seating installation as claimed in claim 1, wherein each shield interposes between one side of a respective seat unit in one of the files and the back of a seat unit in the other file, thereby defining a space at the back of the seat unit in the other file between its back-rest and the shield.

11. A seating installation as claimed in claim 10, wherein each shield curves partially around the back of the seat of the seat unit in the one file to increase the size of said space behind the seat of the seat unit in the other file.

12. A seating installation as claimed in claim 1, wherein each seat unit further comprises a leg-rest.

13. A seating installation as claimed in claim 12, wherein each seat unit comprises a side-screen extending juxtaposed said leg-rest, which side screen is flared outwardly at floor level to afford extra foot-room for a person using the seat unit.

14. A seating installation as claimed in claim 1, wherein the shields form, for each seat unit, a rear screen at its back behind its back-rest and side-screens to each side of the seat unit.

15. A seating installation as claimed in claim 14, wherein the rear screen of each seat is spaced from the back-rest to afford additional space behind the back-rest.

16. A seating installation as claimed in claim 14, wherein the rear screen of said one seat unit and one side screen of the adjacent seat unit define said bay at the back of the seat unit.

17. A seating installation as claimed in claim 16, wherein said rear screen is curved to define an alcove behind the seat of the one seat unit to afford extra space for the seat of the adjacent seat unit at a first level and extra space for the seat of the one seat unit at a second level, the first level being above the second level.

18. A seating installation as claimed in claim 1, wherein the seat units are convertible into a bed configuration.

19. A seating installation as claimed in claim 18, wherein the seats can recline into a bed configuration in which the seat-pan and back-rest are substantially coplanar.

20. A seating installation as claimed in claim 18, wherein in the bed configuration the corresponding seat unit extends into the bay.

21. A seating installation as claimed in claim 18, wherein the seat-pan and back-rest are movable into a bed configuration, optionally cooperating with other fixed or movable surfaces forming part of the seat unit.

22. A seating installation as claimed in claim 21, wherein the back-rest is arranged to fold forwardly and a rear surface of the back-rest is adapted to form part of a bed surface.

23. A seat-pair for a passenger vehicle, especially an aeroplane, said seat-pair comprising:
    first and second seat units, each seat unit having a back and two opposite sides and comprising a seat, which seat has a backrest and a seat-pan and defines a respective seat axis, and
    a shield interposed between the first and second seat units,
        the first and second seat units being arranged such that their respective seat axes subtend an acute angle,
        the backrest of the first seat unit being positioned generally behind the back of the second seat unit,
        the back of the second seat unit being disposed generally to one side of the first seat unit, and
        the shield forming a side screen for the first seat unit and a rear screen for the second seat unit by traversing the respective seat axis of the second seat unit.

24. A seat-pair as claimed in claim 23, wherein said seat units define a notional centreline therebetween, the seat units having reflectional and translational symmetry about the centreline.

25. A seat-pair as claimed in claim 24, wherein the seats are reclinable and are arranged such that in the reclined position the backrest of each seat extends over the centreline.

26. A seat-pair as claimed in claim 23, wherein the seats are convertible into a bed configuration and, in such bed configuration, the first seat extends to the back of the second seat.

27. A seat-pair as claimed in claim 26, wherein said shield is curved to define an alcove behind the seat of the second seat unit to afford extra space for the seat of the first seat unit at a first level and extra space for the seat of the second seat unit at a second level, the first level being above the second level.

28. A seat-pair as claimed in claim 27, wherein the shield is curved to afford extra space for the seat of the second seat unit at the second level in the bed configuration.

29. A seat pair as claimed in claim 27, wherein the shield is curved to afford extra space for the seat of the first seat unit at the first level in the seat configuration.

* * * * *